(12) United States Patent
Shen et al.

(10) Patent No.: US 12,501,192 B2
(45) Date of Patent: Dec. 16, 2025

(54) RECORD PLAYER AND SPEAKER COMBINED SHOCK ABSORPTION STRUCTURE

(71) Applicant: ZHONGSHAN CITY RICHSOUND ELECTRONIC INDUSTRIAL LTD, Guangdong Province (CN)

(72) Inventors: Yang Shen, Shenzhen (CN); Quanbiao Liang, Zhongshan (CN)

(*) Notice: Subject to any disclaimer, the term of this patent is extended or adjusted under 35 U.S.C. 154(b) by 182 days.

(21) Appl. No.: 18/544,162

(22) Filed: Dec. 18, 2023

(65) Prior Publication Data
US 2025/0142239 A1    May 1, 2025

(30) Foreign Application Priority Data
Oct. 30, 2023  (CN) .......................... 202311425044.4

(51) Int. Cl.
*H04R 1/02* (2006.01)

(52) U.S. Cl.
CPC .................... *H04R 1/025* (2013.01)

(58) Field of Classification Search
CPC ...................................... H04R 1/025
USPC ........................................... 381/386
See application file for complete search history.

(56) References Cited

U.S. PATENT DOCUMENTS

| | | | |
|---|---|---|---|
| 3,268,229 A * | 8/1966 | Funk | G11B 33/02 |
| | | | 281/31 |
| 2024/0005950 A1 * | 1/2024 | Rapp | G11B 3/60 |

FOREIGN PATENT DOCUMENTS

CN   219832181 U  * 10/2023
JP     3473110 B2 * 12/2003

* cited by examiner

*Primary Examiner* — Sean H Nguyen
(74) *Attorney, Agent, or Firm* — Che-Yang Chen; Law Office of Michael Chen

(57) ABSTRACT

A record player and speaker combined shock absorption structure may include supporting feet arranged on a record player and box holes arranged on a housing of a speaker; the supporting feet are located in the box holes; and gaps are arranged between the supporting feet and the box holes. Through the above structure, the record player and the speaker can be combined through stacking in the upper and lower positions, and the gaps make the supporting feet and the box holes not in contact, so as to play a role of isolating shock. Thus, the above structure makes full use of the indoor space, and the architecture is simple and has good shock absorption effect.

10 Claims, 6 Drawing Sheets

RECORD PLAYER AND SPEAKER COMBINED SHOCK ABSORPTION STRUCTURE

FIELD OF THE INVENTION

The present invention relates to an audio player, and in particular to a record player and speaker combined shock absorption structure.

BACKGROUND OF THE INVENTION

A record player is a device that produces slight vibration through contact between a stylus and a turntable to achieve sound reproduction.

In order to obtain high-quality sound, the current record player generally does not have a speaker. Because the vibration of the speaker is transmitted to the stylus which is very sensitive to the vibration, the record player and the speaker are in two different positions. The speaker is connected through a signal line. In the above mode, not only a large space is occupied, but also the space is messy because the signal line is exposed.

Therefore, a new structure is needed to combine the record player and the speaker together, and is also required to be subject to shock-proof design, so the applicant designs a record player and speaker combined shock absorption structure.

SUMMARY OF THE INVENTION

To overcome the defects in the prior art, the present invention provides a record player and speaker combined shock absorption structure.

To solve the technical problems, the present invention adopts the following technical solution:

A record player and speaker combined shock absorption structure comprises supporting feet arranged on a record player and box holes arranged on a housing of a speaker; the supporting feet are located in the box holes; and gaps are arranged between the supporting feet and the box holes.

Shock absorption sleeves are arranged in the gaps, and the supporting feet are located in the shock absorption sleeves.

The upper ends of the shock absorption sleeves are provided with upper limiting pieces, and the lower ends of the shock absorption sleeves are provided with lower limiting pieces.

The housing is provided with an upper groove and a lower groove; the box holes penetrate through the upper groove and the lower groove; the upper limiting pieces are located in the upper groove; and the lower limiting pieces are located in the lower groove.

The record player and speaker combined shock absorption structure further comprises a pressure ring which is located in the upper groove and fixed with the housing to press the upper limiting pieces into the upper groove.

An inner bushing is arranged in the housing; the box holes are composed of pipe holes of the inner bushing; and the shock absorption sleeves are installed in the inner bushing.

One end of the pipe holes of the inner bushing is provided with a bushing groove and the outer wall of the inner bushing is provided with a locking piece; the locking piece is located in the lower groove; the pressure ring is connected with the inner bushing through screws and matched with the locking piece to fix the inner bushing and the housing; and the lower limiting pieces are located in the bushing groove.

The supporting feet comprise upper supporting rods and lower supporting rods; the lower supporting rods are provided with foot limiting pieces; and the upper supporting rods and the lower supporting rods are fixed by screws.

One end of each lower supporting rod is provided with an installing hole and the other end is provided with a connecting hole; the installing hole is communicated with the connecting hole through a sliding hole; each upper supporting rod can be located in the sliding hole; a shock absorption spring sleeved on the upper supporting rod is arranged in the installing hole; the end surface of the upper supporting rod is provided with a connecting screw hole; and a connecting screw is located in the connecting hole and locked with the connecting screw hole.

The supporting feet are provided with positioning cones, and the box holes are provided with positioning conical holes.

The present invention has the following beneficial effects: the present invention comprises the supporting feet arranged on the record player and the box holes arranged on the housing of the speaker; the supporting feet are located in the box holes; and gaps are arranged between the supporting feet and the box holes. Through the above structure, the record player and the speaker can be combined through stacking in the upper and lower positions, and the gaps make the supporting feet and the box holes not in contact, so as to play a role of isolating shock. Thus, the above structure makes full use of the indoor space, and the architecture is simple and has good shock absorption effect.

DESCRIPTION OF THE DRAWINGS

The present invention will be further described below in combination with the drawings and the embodiments.

DETAILED DESCRIPTION OF THE INVENTION

Figure 1:
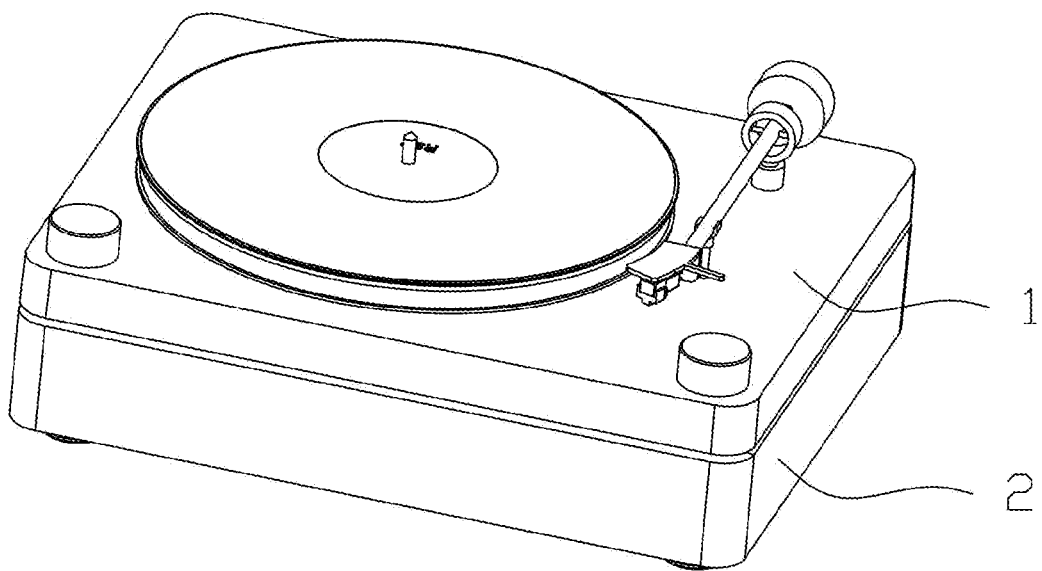
FIG. 1 is an overall structural diagram of the product.

The advantages and the features of the present disclosure and the implementation method thereof will be illustrated with reference to the following embodiments described in the drawings. However, the present disclosure may be reflected in different forms and shall not be interpreted to be limited to the embodiments described herein. On the contrary, the embodiments are provided to make the present disclosure comprehensive and complete, and the scope of the present disclosure will be sufficiently communicated to those skilled in the art. In addition, the present disclosure is defined only by the scope of the claims.

The shapes, dimensions, proportions, angles, and numbers disclosed in the drawings used to describe the embodiments of the present disclosure are examples only, and thus the present disclosure is not limited to the details shown. The same reference signs in the whole description refer to same elements. In the following description, when the detailed description of a relevant known function or configuration is determined to unnecessarily obscure the emphasis of the present disclosure, the detailed description will be omitted. In the case that "comprise", "have" and "include" described in this description are used, other components may be added unless "only" is used. A term in a singular form may comprise a plural form unless otherwise indicated.

When an element is interpreted, although not explicitly described, the element is understood to comprise an error range.

When positional relationships are described, for example, when the positional relationships are described as "on", "above", "below" and "adjacent", unless "closely adjacent" or "directly" is used, one or more parts may be arranged between two other parts.

When time relationships are described, for example, when time sequences are described as "after", "subsequently", "next" and "before", unless "just" or "directly" is used, discontinuous situations may be included.

It should be understood that although the terms "first", "second", etc. may be used herein to describe various elements, these elements should not be limited by these terms. These terms are used only to distinguish one element from other elements. For example, a first element may be called a second element, and similarly, the second element may be called the first element without deviating from the scope of the present disclosure.

As may be fully understood by those skilled in the art, the features of different embodiments of the present disclosure may be partially or fully coupled or combined with each other, and may collaborate with each other and may be technically driven in various modes. The embodiments of the present disclosure may be executed independently of each other or together in an interdependent relationship.

Figure 2:
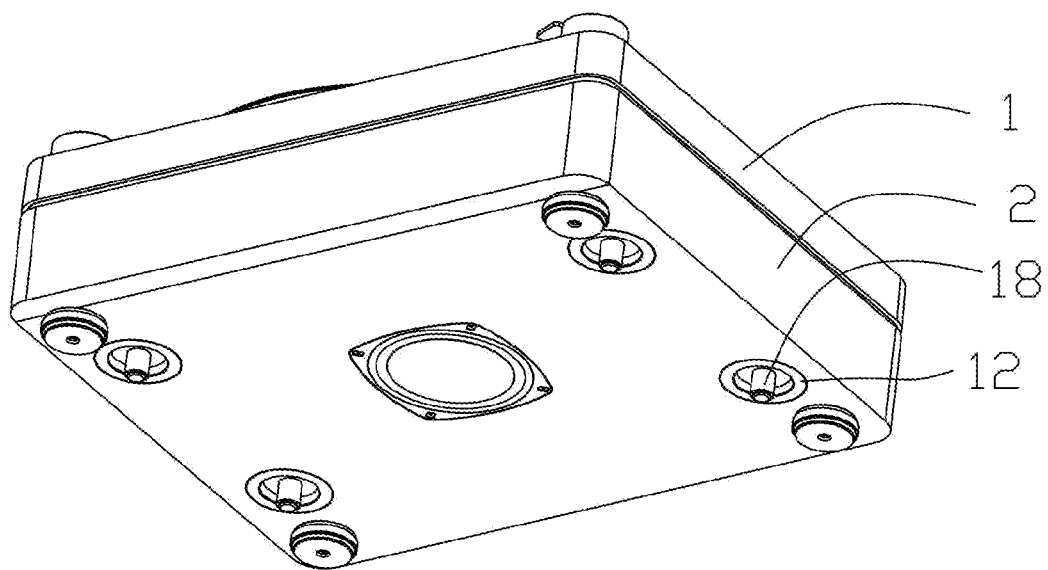
FIG. 2 is an overall structural diagram of the product in another direction.
Figure 3:
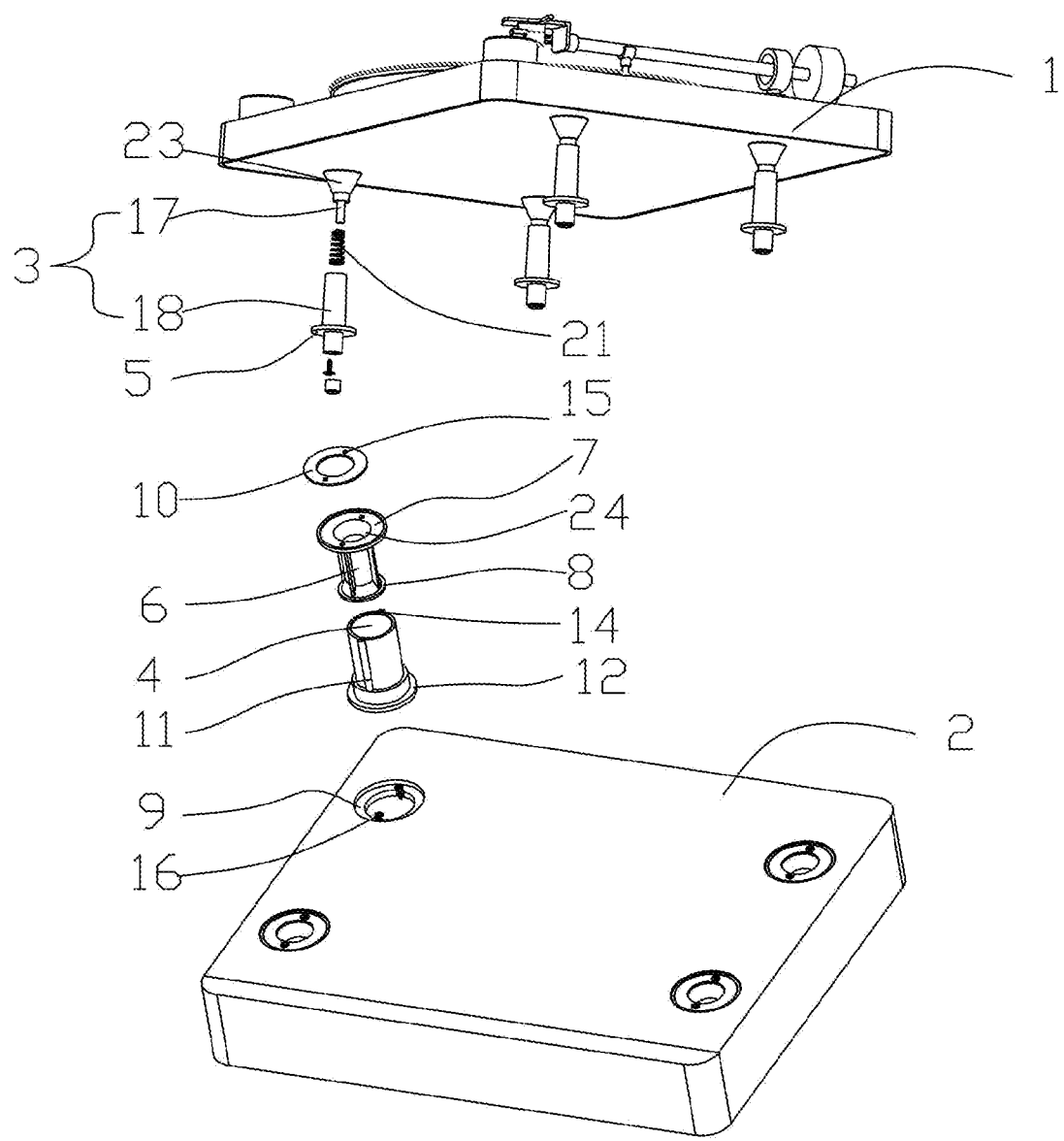
FIG. 3 is an exploded structural diagram of the product.
Figure 4:
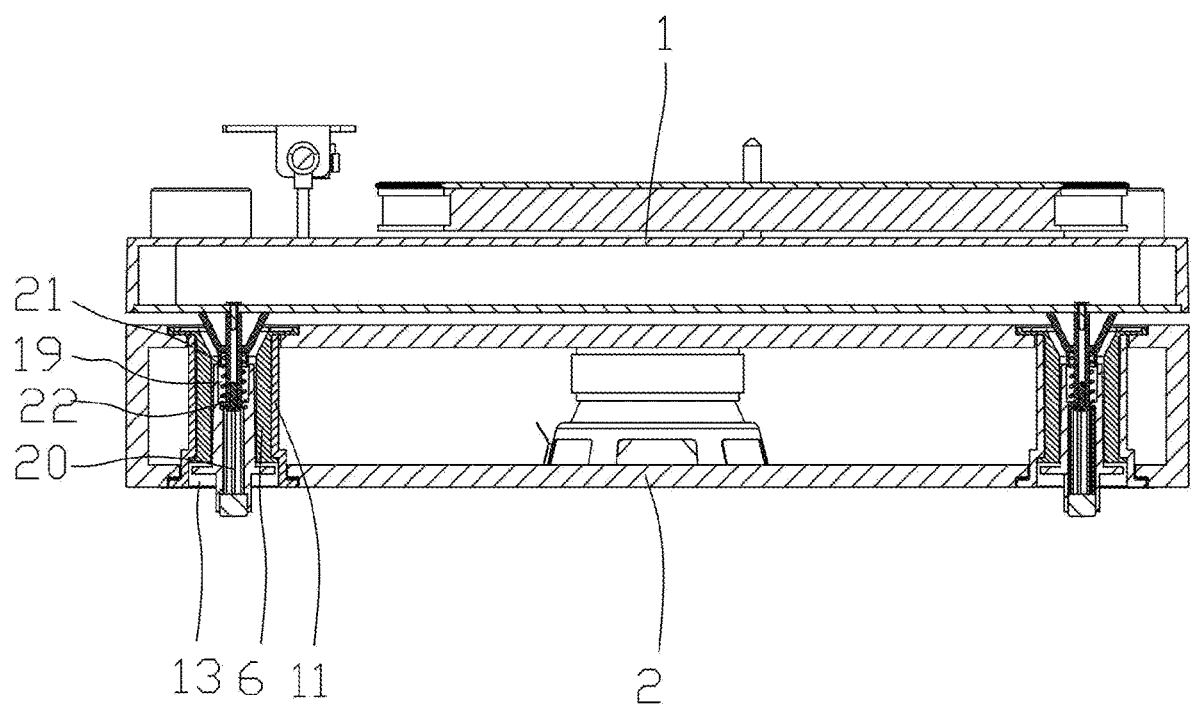
FIG. 4 is a sectional structural diagram of the product.
Figure 5:
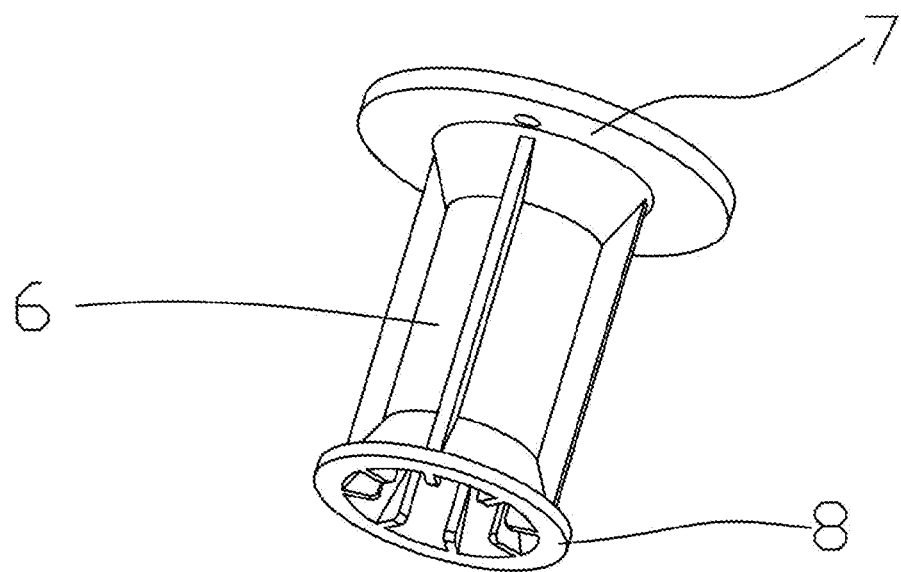
FIG. 5 is a structural diagram of a shock absorption sleeve.
Figure 6:
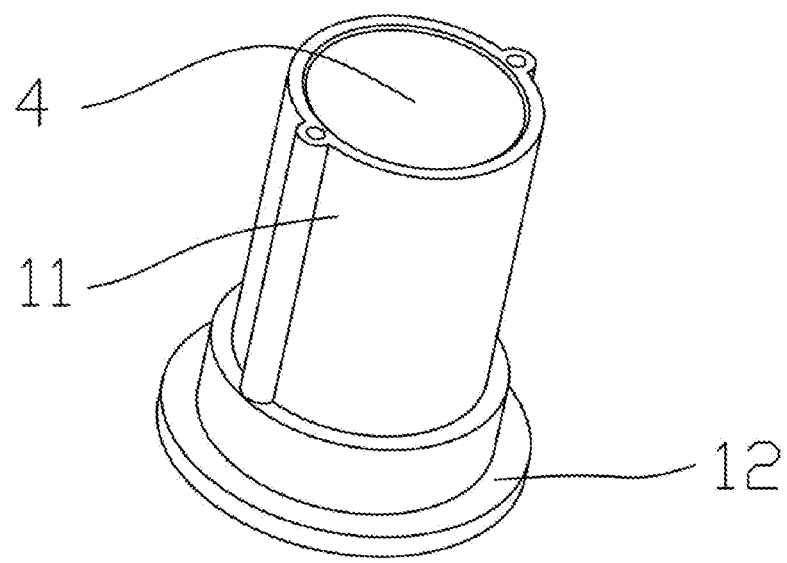
FIG. 6 is a structural diagram of an inner bushing.

By referring to FIG. 1 to FIG. 6, the present invention discloses a record player and speaker combined shock absorption structure, which comprises supporting feet 3 on a record player 1 and box holes 4 arranged on a housing of a speaker 2; and then, the supporting feet 3 are located in the box holes 4. Of course, the bottom surface of the speaker 2 is also provided with the supporting feet, and gaps are arranged between the supporting feet 3 and the box holes 4. When placed in this way, the record player 1 and the speaker 2 can be stacked up and down and combined together. Through the above structure, the record player 1 and the speaker 2 can be combined through stacking in the upper and lower positions, and the gaps make the supporting feet 3 and the box holes 4 not in contact, so as to play a role of isolating shock. The above structure not only makes full use of the indoor space, but also hides signal lines which are very short behind the record player 1 and the speaker 2, so the overall structure is beautiful. As a further preferred structure, the height of the supporting feet 3 is higher than the height of the speaker 2. In this way, when the record player 1 and the speaker 2 are placed on a table at the same time, the bottom surface of the record player 1 and the top surface of the speaker 2 have a certain distance without contact, thereby playing a role of isolating shock and achieving a good shock absorption effect. Of course, in order to prevent the supporting feet 3 from separating from the box holes 4, the supporting feet 3 are provided with supporting foot plates 5, and the supporting foot plates 5 can be clamped on the bottom surface of the housing.

However, the integrity of the speaker 2 and the record player 1 in the above structure is not strong. Especially, the gaps between the supporting feet 3 and the box holes 4 are easy to make the relative position between the speaker 2 and the record player 1 skewed, resulting in the overall unbeauty. Therefore, the present application is provided with shock absorption sleeves 6 in the gaps, and the supporting feet 3 are located in the shock absorption sleeves 6. The shock absorption sleeves 6 fill the gaps, which not only absorbs the shock, but also makes the relative position between the speaker 2 and the record player 1 fixed and not skewed. A soft silicone material is selected for the shock absorption sleeves 6 of the present application, so the shock absorption effect is good.

As shown in the figure, as a specific structure, the upper ends of the shock absorption sleeves 6 are provided with upper limiting pieces 7, and the lower ends of the shock absorption sleeves 6 are provided with lower limiting pieces 8. The upper limiting pieces 7 and the lower limiting pieces 8 are annular films and formed by integral injection molding with the shock absorption sleeves 6. When installing, the shock absorption sleeves 6 are inserted into the box holes 4 by direct extrusion, and then the upper limiting pieces 7 and the lower limiting pieces 8 are clamped with the corresponding surface of the housing, so that the shock absorption sleeves 6 are fixed. As a further structure, the housing is provided with an upper groove 9 and a lower groove; the box holes 4 penetrate through the upper groove 9 and the lower groove; the upper limiting pieces 7 are located in the upper groove 9; and the lower limiting pieces 8 are located in the lower groove. In this way, the upper limiting pieces 7 and the lower limiting pieces 8 may not protrude from the surface of the housing, so the structure is beautiful. As a further structure, the structure further comprises a pressure ring 10 which is located in the upper groove 9 and fixed with the housing to press the upper limiting pieces 7 into the upper groove 9. In this way, the shock absorption sleeves 6 are fixed more firmly and reliably and may not go out of the box holes 4.

As shown in the figure, an inner bushing 11 is arranged in the housing; the box holes 4 are composed of pipe holes of the inner bushing 11; and the shock absorption sleeves 6 are installed in the inner bushing 11. Because the housing of the present application is made of wood, it is difficult to process an inner cavity of the housing and the box holes 4 on the wood. Thus, the housing of the present application is composed of six wooden boards, and then through holes, the upper groove 9 and the lower groove are processed on the wooden boards. The inner bushing 11 is inserted into the through holes to form the box holes 4, and the inner bushing 11 is formed by nylon injection molding. The specific structure is as follows: one end of the pipe holes of the inner bushing 11 is provided with a bushing groove 13 and the outer wall of the inner bushing 11 is provided with a locking piece 12; the locking piece 12 is an annular film and formed by integral injection molding with the inner bushing 11; the locking piece 12 is located in the lower groove; the pressure ring 10 is connected with the inner bushing 11 through screws and matched with the locking piece 12 to fix the inner bushing 11 and the housing; and the lower limiting pieces 8 are located in the bushing groove 13. Of course, the supporting foot plates 5 can be clamped with the bushing groove 13, so as to prevent the structure from protruding and becoming not beautiful. Of course, the end surface of the inner bushing 11 has a screw hole 14, and the pressure ring 10 has a through hole 15; a screw 16 penetrates through the through hole 15 and is matched with the screw hole 14 to fix the inner bushing 11. Moreover, the above structure also ensures that the lower limiting pieces 8 are not exposed. In order to prevent air leakage of the housing, a sealing gasket is arranged between the locking piece 12 and the lower groove. The gap between the inner bushing 11 and the lower end of the through hole 15 is sealed by the sealing gasket, and the upper end of the inner bushing 11 is sealed directly by the upper limiting pieces 7. The gap between the inner bushing 11 and the upper end of the through hole 15 is sealed by pressing the upper limiting pieces 7 with the pressure ring 10. Moreover, when the pressure ring 10 and the inner bushing 11 are locked, not only the sealing gasket can be extruded through the inner bushing 11, but also the upper limiting pieces 7 are extruded by the pressure ring 10. Thus, the tighter the inner bushing 11 and the pressure ring 10 are locked, the tighter the sealing gasket and the upper limiting pieces 7 are pressed, so as to achieve better sealing and installation firmness.

As shown in the figure, the supporting feet 3 comprise upper supporting rods 17 and lower supporting rods 18; the lower supporting rods 18 are provided with foot limiting pieces; and the upper supporting rods 17 and the lower supporting rods 18 are fixed by screws. The above structure facilitates the installation. After the shock absorption sleeves 6 are installed into the box holes 4, the upper supporting rods 17 and the lower supporting rods 18 are inserted into the shock absorption sleeves 6 respectively from the upper and lower ends and locked by the screws 16.

As shown in the figure, to avoid transferring the shock of the table to the record player 1, one end of each lower supporting rod 18 is provided with an installing hole 19 and the other end is provided with a connecting hole 20; the installing hole 19 is communicated with the connecting hole 20 through a sliding hole; each upper supporting rod 17 can be located in the sliding hole; a shock absorption spring 21 sleeved on the upper supporting rod 17 is arranged in the installing hole 19; the end surface of the upper supporting rod 17 is provided with a connecting screw hole; and a connecting screw 22 is located in the connecting hole 20 and locked with the connecting screw hole. Through the above structure, the upper supporting rod 17 is supported by the shock absorption spring 21, so as to absorb shock and play a role of shock absorption. The connecting screw 22 achieves the purposes of preventing the upper supporting rod 17 from going out of the installing hole 19 and making the upper supporting rod 17 move up and down.

As shown in the figure, the supporting feet 3 are provided with positioning cones 23, and the box holes 4 are provided with positioning conical holes 24. In this way, when the upper supporting rod 17 is installed, it is convenient for positioning. Of course, the gaps of the present application are filled with the shock absorption sleeves 6, so the positioning conical holes 24 are arranged in the inner holes of the shock absorption sleeves 6. When a user lifts the lower speaker, the upper record player moves down under the action of gravity. In the process of moving down, the positioning cones 23 located on the record player and the positioning conical holes 24 located on the speaker have a guiding effect, so that the supporting feet 3 are returned and located in the centers of the box holes 4. Thus, the relative position between the record player and the speaker can be restored to the normal positions of symmetry, so that the integrity of the record player and the speaker is stronger.

The record player and speaker combined shock absorption structure provided in the embodiments of the present invention is described in detail above. Specific individual cases are applied herein for elaborating the principle and embodiments of the present invention. The illustration of the above embodiments is merely used for helping to understand the method of the present invention and the core thought thereof. Meanwhile, for those ordinary skilled in the art, specific embodiments and the application scope may be changed in accordance with the thought of the present invention. In conclusion, the contents of the description shall not be interpreted as a limitation to the present invention.

What is claimed is:

1. A record player and speaker combined shock absorption structure, comprising supporting feet arranged on a record player and box holes arranged on a housing of a speaker; the supporting feet are located in the box holes; and gaps are arranged between the supporting feet and the box holes.

2. The record player and speaker combined shock absorption structure according to claim 1, wherein shock absorption sleeves are arranged in the gaps, and the supporting feet are located in the shock absorption sleeves.

3. The record player and speaker combined shock absorption structure according to claim 2, wherein the upper ends of the shock absorption sleeves are provided with upper limiting pieces, and the lower ends of the shock absorption sleeves are provided with lower limiting pieces.

4. The record player and speaker combined shock absorption structure according to claim 3, wherein the housing is provided with an upper groove and a lower groove; the box holes penetrate through the upper groove and the lower groove; the upper limiting pieces are located in the upper groove; and the lower limiting pieces are located in the lower groove.

5. The record player and speaker combined shock absorption structure according to claim 4, further comprising a pressure ring which is located in the upper groove and fixed with the housing to press the upper limiting pieces into the upper groove.

6. The record player and speaker combined shock absorption structure according to claim 5, wherein an inner bushing is arranged in the housing; the box holes are composed of pipe holes of the inner bushing; and the shock absorption sleeves are installed in the inner bushing.

7. The record player and speaker combined shock absorption structure according to claim 6, wherein one end of the pipe holes of the inner bushing is provided with a bushing groove and the outer wall of the inner bushing is provided with a locking piece; the locking piece is located in the lower groove; the pressure ring is connected with the inner bushing through screws and matched with the locking piece to fix the inner bushing and the housing; and the lower limiting pieces are located in the bushing groove.

8. The record player and speaker combined shock absorption structure according to claim 1, wherein the supporting feet comprise upper supporting rods and lower supporting rods; the lower supporting rods are provided with foot limiting pieces; and the upper supporting rods and the lower supporting rods are fixed by screws.

9. The record player and speaker combined shock absorption structure according to claim 1, wherein one end of each lower supporting rod is provided with an installing hole and the other end is provided with a connecting hole; the installing hole is communicated with the connecting hole through a sliding hole; each upper supporting rod can be located in the sliding hole; a shock absorption spring sleeved on the upper supporting rod is arranged in the installing hole; the end surface of the upper supporting rod is provided with a connecting screw hole; and a connecting screw is located in the connecting hole and locked with the connecting screw hole.

10. The record player and speaker combined shock absorption structure according to claim 1, wherein the supporting feet are provided with positioning cones, and the box holes are provided with positioning conical holes.

* * * * *